(12) United States Patent
Yoshimi et al.

(10) Patent No.: US 7,521,497 B2
(45) Date of Patent: Apr. 21, 2009

(54) SAPONIFIED, ALKOXYL GROUP-CONTAINING ETHYLENE-VINYL ACETATE COPOLYMER AND ITS PROCESSED PRODUCTS

(75) Inventors: Kazuyori Yoshimi, Kurashiki (JP); Osamu Kazeto, Kurashiki (JP); Masako Katayama, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 97 days.

(21) Appl. No.: 10/728,937

(22) Filed: Dec. 8, 2003

(65) Prior Publication Data

US 2004/0204549 A1    Oct. 14, 2004

Related U.S. Application Data

(63) Continuation of application No. 09/715,082, filed on Nov. 20, 2000, now abandoned.

(30) Foreign Application Priority Data

Nov. 18, 1999    (JP) .................................. 11-327793

(51) Int. Cl.
    *C08K 5/55*    (2006.01)
    *C08K 5/09*    (2006.01)
    *C08F 210/02*    (2006.01)
    *C08F 218/08*    (2006.01)
    *B29C 47/00*    (2006.01)
    *B29C 47/06*    (2006.01)

(52) U.S. Cl. ........................ 524/183; 524/318; 524/322; 524/331

(58) Field of Classification Search ................. 524/183, 524/318, 322, 331; 526/331
    See application file for complete search history.

(56) References Cited

U.S. PATENT DOCUMENTS

| | | | |
|---|---|---|---|
| 2,941,988 A | 6/1960 | Wolf | |
| 2,984,652 A | 5/1961 | Jordan, Jr. | |
| 3,043,698 A | 7/1962 | Chambers, Jr. | |
| 3,129,196 A | 4/1964 | Gordon | |
| 4,485,225 A * | 11/1984 | Satoh et al. ................. | 526/331 |
| 4,649,186 A * | 3/1987 | Jenkins et al. ................. | 526/87 |
| 4,746,700 A | 5/1988 | Takida | |
| 4,871,613 A * | 10/1989 | Akao ......................... | 428/328 |
| 5,110,643 A * | 5/1992 | Akao et al. ................. | 428/35.9 |
| 5,744,547 A * | 4/1998 | Moritani et al. ............... | 525/62 |
| 5,804,020 A * | 9/1998 | Akao et al. ................... | 156/251 |
| 6,383,583 B1 | 5/2002 | Ninomiya et al. | |

FOREIGN PATENT DOCUMENTS

| | | |
|---|---|---|
| DE | 506 148 | 8/1930 |
| EP | 0 457 262 | 11/1991 |
| EP | 0 751 153 | 1/1997 |
| EP | 0 884 352 | 12/1998 |
| EP | 0 906 924 | 4/1999 |
| FR | 2 527 617 | 12/1983 |
| JP | 55-12108 | 1/1980 |
| JP | 55012108 A1 * | 1/1980 |
| JP | 57-34148 | 2/1982 |
| JP | 57034148 * | 2/1982 |
| JP | 62-128754 | 6/1987 |
| JP | 62128754 A1 * | 6/1987 |
| JP | 63-046202 | 2/1988 |

OTHER PUBLICATIONS

Database WPI, Section Ch, Week 9323; Derwent Publications Ltd., London, GB; AN 1987-201798; XP002160018 & JP 62 128754 A (Kuraray Co., Ltd.).

* cited by examiner

*Primary Examiner*—Kelechi C Egwim
(74) *Attorney, Agent, or Firm*—Oblon, Spivak, McClelland, Maier & Neustadt, P.C.

(57) ABSTRACT

A saponified ethylene-vinyl acetate resin, containing from 0.1 to 3000 ppm of a compound having a molecular weight of at most 1000 and having at least one conjugated double bond, an alkoxy group content of from 0.0005 to 1 mol %, an ethylene content of from 5 to 60 mol %, and a degree of saponification of at least 85 mol % has good melt extrusion stability, drawdown resistance, interlayer adhesion and gas barrier properties, and products made therefrom have good surface smoothness. The saponified ethylene-vinyl acetate resin may be produced by polymerizing a mixture of ethylene and vinyl acetate in the presence of a polymerization initiator having an alkoxy group, thereby producing an ethylene-vinyl acetate copolymer, adding a compound having a molecular weight of at most 1000 and at least one conjugated double bond to the ethylene-vinyl acetate copolymer, then saponifying the ethylene-vinyl acetate copolymer, thereby forming a saponified ethylene-vinyl acetate copolymer.

18 Claims, No Drawings

SAPONIFIED, ALKOXYL GROUP-CONTAINING ETHYLENE-VINYL ACETATE COPOLYMER AND ITS PROCESSED PRODUCTS

This application is a Continuation application of U.S. Ser. No. 09/715,082 filed on Nov. 20, 2000, pending.

BACKGROUND OF THE INVENTION

1. Field of the Invention

The present invention is a saponified ethylene-vinyl acetate resin having good melt extrusion stability, drawdown resistance, interlayer adhesion and gas-barrier properties, and products made therefrom having good surface smoothness.

2. Description of the Related Art

Saponified ethylene-vinyl acetate resins (hereinafter referred to as EVOH), have good gas-barrier properties and melt processability, and may be melt processed into films, sheets, pipes, tubes, bottles and other types of products. These products are particularly useful as packaging materials for food, and for packaging materials that are required to have good gas-barrier properties.

However, products made from conventional EVOH resin often exhibit "streaks" running in the extrusion-processing direction which degrade the appearance of the products. This is a long-standing problem which has assumed great importance in the field of extruding EVOH materials, because these streaks significantly detract from the commercial value of EVOH products which have them. The degradation in appearance caused by such "streaks" differs from that caused by "skin roughness", "fish eyes", "hard spots" and other discontinuities appearing on the surfaces of EVOH products, which are discussed in JP-A-197603/1986 and JP-A-71620/1997. Specifically, these streaks appear on the surfaces of EVOH products, and are nearly continuous in the extrusion direction.

While "streaks" are most often seen in single-layered EVOH extruded products, they are also observed when multi-layer extrusion products, containing both EVOH layers and layers formed by other thermoplastic resins. In addition, streaks can appear immediately from the start of extrusion processing, but may often not be apparent at the beginning of an extrusion process, but may then appear sometime later in the process.

EVOH also has other technical problems:

The load on the extruder varies during the extrusion of EVOH, thereby causing fluctuations in the product thickness;

When EVOH is processed into films or sheets or into parisons for pipes or bottles by extrusion, the product often exhibits "drawdown" from the die (i.e., a reduction in width and/or thickness of the polymer melt upon exiting the extruder die);

When EVOH is co-extruded with other thermoplastic resins, the resulting products do not always exhibit good interlayer adhesion, causing delamination of the layers of the co-extruded product.

SUMMARY OF THE INVENTION

The object of the present invention is to obtain EVOH having good melt extrusion stability, drawdown resistance, interlayer adhesion and gas-barrier properties, and to obtain processed EVOH products having good surface smoothness.

The EVOH resin according to the present invention contains from 0.1 to 3000 ppm of a compound having a molecular weight of at most 1000 and having at least one conjugated double bond, and has an alkoxy group content of from 0.0005 to 1 mol %, and an ethylene content of from 5 to 60 mol %, based on the total moles of monomer units in the EVOH resin, and a degree of saponification of at least 85 mol % (based on the moles of vinyl acetate monomer units in the EVOH before saponification).

DETAILED DESCRIPTION OF THE INVENTION

In one preferred embodiment, the EVOH resin of the present invention contains from 10 to 5000 ppm, of a higher fatty acid or its derivative, based on the weight of the free acid relative to the weight of the EVOH resin. In another preferred embodiment, the EVOH resin of the present invention contains from 10 to 5000 ppm of a boron compound (based on the weight of elemental boron in the compound relative to the weight of the EVOH resin).

Extruded EVOH products according to the present invention include products made by extruding a single-layer of the EVOH of the present invention, as well as products made by multi-layered coextrusion, and containing at least one layer of the EVOH of the present invention. Such single-layer and multilayer products include films, laminates, parisons, tubes, etc., as well as products made therefrom, including bags, pouches, hoses, blow molded or thermoformed containers, bottles, etc.

Preferably, the EVOH resin of the present invention is produced by polymerizing an ethylene-vinyl acetate copolymer (hereinafter referred to as EVA) in the presence of a polymerization initiator containing at least one alkoxy group, saponifying the copolymer, thereby producing an EVOH containing at least one alkoxy group, and adding a compound having a molecular weight of at most 1000 and having at least one conjugated double bond. In addition, the EVOH according to the present invention may be prepared as discussed above, then adding thereto a higher fatty acid or derivatives thereof, and/or a boron compound.

Both the single-layered EVOH extrusion product and the multi-layered coextrusion product containing a layer of the EVOH of the present invention are produced by single-layer extrusion or multi-layer coextrusion, respectively, an EVOH prepared by saponifying an EVA polymerized in the presence of a polymerization initiator containing an alkoxy group, and containing a compound having a molecular weight of at most 1000 and having at least one conjugated double bond. In addition, the single-layer extruded EVOH product and the multi-layer coextruded EVOH products according to the present invention may be prepared, as discussed above, from an EVOH resin according to the present invention to which a higher fatty acid or derivatives thereof and/or a boron compound has been added.

DETAILED DESCRIPTION OF THE INVENTION

The alkoxy group-containing EVOH of the present invention contains at least one alkoxy group of formula (1):

(1)

wherein R indicates an alkyl group having from 1 to 5 carbon atoms. The number of carbon atoms of the alkoxy group should be between 1 and 5 in order to obtain an EVOH resin having good melt extrusion stability, drawdown resistance, interlayer adhesion and gas-barrier properties. Preferably, the number of carbon atoms should be between 1 and 3, and is most preferably 1.

The ethylene content of the EVOH of the present invention is at least 5 mol %, preferably at least 10 mol %, more preferably at least 20 mol %, and is at most 60 mol %, preferably at most 57 mol %, more preferably at most 55 mol %. In other words, the ethylene content of the EVOH of the present invention should be 5 to 60 mol %, more preferably 10 to 57 mol %, most preferably 20 to 55 mol %, inclusive of all values and subranges therebetween. EVOH resins having an ethylene content less than 5 mol % have poor melt extrusion stability, and the extruded products made therefrom do not have good surface smoothness, and have poor gas-barrier properties at high humidity. EVOH resins having an ethylene content greater than the defined range (i.e., greater than 60 mol %) have poor drawdown resistance, interlayer adhesion and gas-barrier properties.

The degree of saponification of the vinyl acetate moiety in the EVOH of the invention is at least 85 mol %, preferably at least 95 mol %, more preferably at least 98 mol %, most preferably at least 99 mol %, based on the number of moles of vinyl acetate monomer in the resin before saponification. An EVOH resin having a degree of saponification less than 85 mol % has poor melt extrusion stability and drawdown resistance, and products made therefrom will have poor surface smoothness and gas-barrier properties at both low and high humidity.

If a mixture of EVOH resins having different ethylene contents and degrees of saponification is employed, the terms "ethylene content" and "degree of saponification" refer to the mean ethylene content and mean degree of saponification of the mixture, respectively.

The EVOH resin of the present invention may contain any other comonomers which do not significantly decrease the processability, interlayer adhesion, and gas barrier properties of the resin. The comonomers may include, for example, olefins such as propylene, 1-butene, isobutene, 4-methyl-1-pentene, 1-hexene, 1-octene, etc.; unsaturated carboxylic acids such as itaconic acid, methacrylic acid, acrylic acid, maleic acid, etc., and their salts, partial or complete esters, amides and anhydrides; vinylsilane compounds such as vinyltrimethoxysilane, etc.; unsaturated sulfonic acids and their salts; alkylthiols; vinylpyrrolidones, etc.

For example, the alkoxy group-containing EVOH of the present invention may comprise copolymerizing ethylene and vinyl acetate with a comonomer having both an alkoxy group and a copolymerizable vinyl group, such as an alkyl vinyl ether, an alkyl allyl ether, an N-alkoxyalkyl(meth)acrylamide or the like, followed by saponifying the resulting copolymer, for example, as in JP-B-21341/1969, JP-A-46202/1988, JP-A-128754/1987, etc.

When an alkoxy group-containing polymerization initiator is used in copolymerizing ethylene and vinyl acetate, the alkoxy group of the polymerization initiator may be introduced into the resulting EVOH polymer. Accordingly, the preferred method for producing the alkoxy group-containing EVOH of the present invention is to introduce the alkoxy group into the EVOH resin by copolymerizing the monomers in the presence of an alkoxy group-containing polymerization initiator. Using this method, it is easier to control the addition of very low levels of the alkoxy group in the polymer, and the polymerization and the introduction of the alkoxy group can be effected simultaneously. In addition to being technically simple, this method also has the advantage of being inexpensive. Examples of a suitable alkoxy group containing polymerization initiator may be found in JP-A-198509/1983, JP-A-206606/1983, JP-A-222102/1983, etc.

The preferred alkoxy group-containing polymerization initiators are alkoxy group-containing azo compounds of the following formula (2):

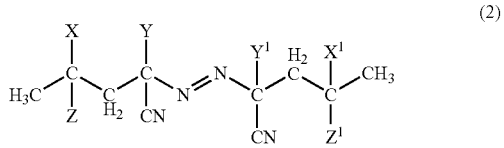

wherein X, X', Y and Y' each represent an alkyl group having from 1 to 5 carbon atoms; and Z and Z' each represent an alkoxy group having from 1 to 5 carbon atoms.

The alkyl groups X and X' may be the same or different, and the alkyl groups Y and Y' may be the same or different, but are preferably the same, because such compounds are easier to prepare and provide good properties for the ultimate polymer. The alkoxy groups Z and Z' may also be the same or different, but are also preferably the same, because such compounds are easier to prepare and provide good properties for the ultimate polymer. Preferred examples of the azo compounds are 2,2'-azobis(4-methoxy-2,4-dimethylvaleronitrile), 2,2'-azobis(4-ethoxy-2,4-diethylvaleronitrile), 2,2'-azobis(4,4'-diethoxy-2-methylvaleronitrile), etc. Of these, the most preferred initiator is 2,2'-azobis(4-methoxy-2,4-dimethylvaleronitrile) because it is very active.

The alkoxy group content of the EVOH resin of the present invention should be at least 0.0005 mol % based on the total number of moles of comonomers, but is preferably at least 0.0007 mol %, more preferably at least 0.001 mol %. EVOH resins having an alkoxy group content less than 0.0005 mol % do not have the desired good processability, interlayer adhesion, and gas barrier properties. The alkoxy group content of the EVOH resin of the invention must be at most 1 mol %, but is preferably at most 0.5 mol %, more preferably at most 0.3 mol %. EVOH resins having an alkoxy group content greater than 1 mol % have poor drawdown resistance, interlayer adhesion and gas-barrier properties.

The alkoxy group content of the EVOH of the present invention may be easily controlled by the selection of the specific type and amount of the polymerization initiator used, the polymerization temperature, and the type and the amount of the polymerization solvent used. Alternatively, the alkoxy group content of the EVOH resin may also be easily controlled by appropriately controlling the monomer ratio of an alkoxy group-containing comonomer in the copolymerization.

The melt flow rate (MFR) of the EVOH resin of the present invention is preferably between 0.1 and 100 g/10 min, more preferably between 0.2 and 20 g/10 min, even more preferably between 0.3 and 10 g/10 min, most preferably between 0.4 and 6 g/10 min. The MFR is measured at 190° C. and under a load of 2160 g, according to JIS K7210. If the EVOH resin has a melting point of around 190° C. or above, the MFR is measured under a load of 2160 g at a different temperatures greater than or equal to the melting point of the resin. The MFR data are then plotted as a semi-logarithmic plot, with the horizontal axis indicating the reciprocal of the absolute temperature and the vertical axis indicating the logarithm of the MFR measured. The value corresponding to 190° C. is extrapolated from the curve of the thus-plotted data.

The compound having a molecular weight of at most 1000 and having at least one conjugated double bond, which is added to the EVOH resin of the present invention, is described in, for example, JP-A-197603/1986, JP-A-197604/1986, JP-A-71620/1997, etc. By conjugated double bond we mean a chemical structure in which two carbon-carbon double bonds are bonded to each other via one carbon-carbon single bond therebetween. Thus, a compound having at least one conjugated double bond has at least two carbon-carbon double bonds separated by a carbon-carbon single bond. Compounds having at least on conjugated double bond include compounds having conjugated diene structures with two carbon-carbon double bonds and one carbon-carbon single bond alternately bonded to each other; conjugated triene structures having three carbon-carbon double bonds and two carbon-carbon single bonds alternately bonded to each other (e.g., 2,4,6-octatriene); and conjugated polyene compounds having more than three carbon-carbon double bonds and more than three carbon-carbon single bonds alternately bonded to each other. In addition, the conjugated double bond-containing compound may have a plurality of independent conjugated double bonds in one molecule, including, for example, tung oil having three conjugated trienes in one molecule, etc.

The conjugated double bond-containing compound may have any other functional group, for example, a carboxyl group and its salts, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and its salts, a phosphoric acid group and its salts, a phenyl group, a halogen atom, a double bond, a triple bond, etc. The functional group may be bonded directly to the carbon atom of the conjugated double bond(s) in the compound, or may be remote from the conjugated double bond(s) therein. The multiple bond in the functional group may conjugate with the conjugated carbon-carbon double bond(s) in the compound. For example, 1-phenylbutadiene having a phenyl group and sorbic acid having a carboxyl group are compounds which have a functional group conjugated with the conjugated carbon-carbon double bond-containing compound defined herein. Addition examples of the conjugated double bond-containing compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, myrcene, etc.

The conjugated double bond of the conjugated double bond-containing compound includes not only aliphatic-aliphatic conjugated double bonds such as those in 2,3-dimethyl-1,3-butadiene and sorbic acid but also aliphatic-aromatic conjugated double bonds such as those in 2,4-diphenyl-4-methyl-1-pentene and 1,3-diphenyl-1-butene. In order to obtain an EVOH resin according to the present invention which has improved properties, however, aliphatic-aliphatic conjugated double bond-containing compounds are preferred. Conjugated double bond-containing compounds which also have a polar group such as a carboxyl group or its salt, a hydroxyl group or the like, are also preferred. Aliphatic-aliphatic conjugated double bond-containing compounds having such a polar group are more preferred.

The conjugated double bond-containing compound should have a molecular weight of at most 1000. If its molecular weight is greater than 1000, the extrusion stability of the EVOH containing it is poor, and the surface smoothness of the products produced therefrom is poor.

The amount of conjugated the double bond-containing compound having a molecular weight of at most 1000 should be at least 0.1 ppm, but is preferably at least 1 ppm, more preferably at least 3 ppm, most preferably at least 5 ppm. In addition, the amount of this compound should be at most 3000 ppm, but is preferably at most 2000 ppm, more preferably at most 1500 ppm, most preferably at most 1000 ppm. In other words, the amount of the conjugated double bond-containing compound having a molecular weight of at most 1000 should be in the range of 0.1 to 3000 ppm, more preferably 3 to 2000 ppm, and most preferably 5 to 1500 ppm. In addition, the amount of this compound may be 10, 20, 30, 40, 50, 60, 70, 80, 90, 100, 200, 300, 400, 500, 600, 700, 800, 900, 1000, 1200, 1400, 1600, 1800, 2000, 2200, 2400, 2600, 2800 and 3000 ppm, inclusive of all values and subranges therebetween.

In order to ensure good extrusion stability, it is desirable that the double bond-containing compound is added to EVA after the polymer has been polymerized but before it has been saponified to EVOH. It is believed that the double bond-containing compound protects the EVA from deterioration before and/or during saponification of the EVA to EVOH.

For better results, a higher fatty acid or derivatives thereof may be added to the EVOH resin of the present invention. This higher fatty acid should have at least 8 carbon atoms, more preferably at least 10 carbon atoms, most preferably at least 12 carbon atoms, but preferably has at most 30 carbon atoms, more preferably at most 25 carbon atoms, most preferably at most 20 carbon atoms. In other words, the higher fatty acid should have 8 to 30 carbon atoms, more preferably 10 to 25 carbon atoms, most preferably 12 to 20 carbon atoms.

Derivatives of such higher fatty acids may include, for example amides, esters, salts, etc. Specific examples of the higher fatty acid derivatives are palmitamide, stearamide, oleamide, linolic amide, linolenic amide, ethylene-bis-stearamide, ethylenebis-oleamide, sodium stearate, calcium stearate, magnesium linolenate, etc. Preferred higher fatty acids and derivatives thereof are higher fatty acid amides and salts of higher fatty acids; more preferred are higher fatty acid amides, and alkali metal salts and alkaline earth metal salts of higher fatty acids; and most preferred are higher fatty acid amides. The higher fatty acids and derivatives thereof which may be added to the EVOH resin of the present invention includes mixtures of two or more higher fatty acids or derivatives thereof.

The total amount of the higher fatty acid or salts thereof in the EVOH of the present invention, based on the weight of the free acid relative to the weight of the EVOH resin, is preferably at least 10 ppm, more preferably at least 50 ppm, even more preferably at least 100 ppm, but is preferably at most 5000 ppm, more preferably at most 2000 ppm, even more preferably at most 1000 ppm. In other words, the total amount of the higher fatty acid or salts thereof in the EVOH of the present invention is preferably 10 to 5000 ppm, more preferably 50 to 2000 ppm, and most preferably 100 to 1000 ppm.

The higher fatty acid or derivatives thereof are preferably added to the EVOH resin of the present invention after the EVA is saponified to EVOH. If the higher fatty acid or derivatives thereof is added to the EVA before it is saponified to EVOH, the higher fatty acid or derivatives thereof will be ineffective.

In order to obtain an EVOH resin which has even better properties, the EVOH resin of the present invention preferably contains a boron compound. The boron compound may include, for example, boric acids, borates, salts of boric acids, boron hydrides, etc. Specifically, the boric acids may include orthoboric acid, metaboric acid, tetraboric acid, etc.; the borates may include triethyl borate, trimethyl borate, etc.; the salts of boric acids may include alkali metal salts and alkaline earth metal salts of the boric acids mentioned above, as well as borax, etc. Orthoboric acid is preferred. In addition, a mixture of two or more of the boron compounds mentioned above may be added to the EVOH resin of the present invention.

The amount of boron compound in the EVOH resin of the present invention, based on the weight of elemental boron relative to the weight of the EVOH resin, is preferably at least 10 ppm, more preferably at least 30 ppm, even more preferably at least 50 ppm, most preferably at least 100 ppm, but is preferably at most 5000 ppm, more preferably at most 3000 ppm, even more preferably at most 2000 ppm, most preferably at most 1500 ppm. In other words, the amount of boron compound is preferably 10 to 5000 ppm, more preferably 30 to 3000 ppm, and most preferably 100 to 1500 ppm. The amount of boron compound may also be 20, 30, 40, 50, 60, 70, 80, 90, 100, 200, 300, 400, 500, 600, 700, 800, 900, 1000, 1500, 2000, 2500, 3000, 3500, 4000, 4500 and 5000 ppm, inclusive of all values and subranges therebetween. If the amount of boron compound is less than 10 ppm, the melt extrusion stability, drawdown resistance and interlayer adhesion of the EVOH resin of the present invention may be poor. If the amount of boron compound is larger than 5000 ppm in the surface smoothness of products made with EVOH resin containing the boron compound may be poor, and the extruder load may fluctuate when melt extruding the EVOH, thereby causing the loss of EVOH extrusion stability.

The boron compound is preferably added to the EVOH after it is formed by saponification of EVA. If the boron compound is added to the EVA before it is saponified to EVOH, the boron compound will not be effective.

The EVOH resin of the present invention may optionally contain additives which do not interfere with the melt extrusion stability, drawdown resistance, interlayer adhesion and gas-barrier properties of the resin. These additives include heat stabilizers, UV absorbents, antioxidants, colorants, fillers, and resins other than EVOH (e.g., polyamide, polyolefins, polyesters, polystyrenes).

The EVOH resin of the present invention can be used in extrusion process, especially in multi-layer coextrusion processes with other thermoplastic resins. Examples of the single-layered extrusion products and multi-layered coextrusion products of the present invention include films, sheets, pipes, tubes, bottles, etc.

Examples of thermoplastic resins capable of being co-extruded with the EVOH resin of the present invention are polyolefins, polyamides, polyesters, polystyrenes, etc. The polyolefins include high-density, middle-density and low-density polyethylenes; polyethylenes copolymerized with any of vinyl acetate, acrylates, butene, hexene, 4-methyl-1-pentene, etc.; ionomers; homopolypropylenes or polypropylenes copolymerized with olefins such as ethylene, butene, hexene, 4-methyl-1-pentene, etc.; poly-1-butenes; poly-4-methyl-1-pentenes; modified polyolefins prepared by grafting the polyolefins mentioned above with unsaturated carboxylic acids such as maleic anhydride, etc. The preferred polyolefins include carboxylic acid-modified polyolefins. By carboxylic acid-modified polyolefins, we mean polyolefins having at least one carboxyl group in the molecule, and include, for example, modified polyolefins grafted with $\alpha,\beta$-unsaturated carboxylic acids or anhydrides thereof, random copolymers of olefin monomers and $\alpha,\beta$-unsaturated carboxylic acids or anhydrides thereof, etc.

The "base" polyolefin resins which are modified (i.e., by grafting) to form carboxylic acid-modified polyolefins include polyethylenes {low-density polyethylene (LDPE), linear low-density polyethylenes (LLDPE), very-low-density polyethylenes (VLDPE)}, polypropylenes, polypropylene copolymers, EVA resins, ethylene-(meth)acrylate copolymers and other types of polyolefins. The $\alpha,\beta$-unsaturated carboxylic acids and anhydrides thereof which may be used to modify the polyolefins include acrylic acid, methacrylic acid, maleic acid, itaconic acid, maleic anhydride, itaconic anhydride, etc. The preferred $\alpha,\beta$-unsaturated carboxylic acid or anhydride is maleic anhydride.

The amount of $\alpha,\beta$-unsaturated carboxylic acid or anhydride in the modified polyolefin, based on the weight of the $\alpha,\beta$-unsaturated carboxylic acid or anhydride relative to the weight of the modified polyolefin, preferably falls between 0.01 and 5% by weight, more preferably between 0.03 and 4% by weight, even more preferably between 0.05 and 3% by weight. The modified polyolefin which may be coextruded with the EVOH resin of the present invention may be entirely composed of polyolefins modified with an $\alpha,\beta$-unsaturated carboxylic acid or anhydride. However, because such modified polyolefin resins are expensive, the preferred resin for coextrusion with the EVOH resin of the present invention is a blend of a polyolefin modified with an $\alpha,\beta$-unsaturated carboxylic acid or anhydride and a non-modified polyolefin, so that the content of the $\alpha,\beta$-unsaturated carboxylic acid or anhydride in the final polyolefin blend will fall within a defined concentration range. As with ionomer resins, all or a part of the carboxyl groups in the modified polyolefins may be in the form of their metal salts.

Polyamides which may be coextruded with the EVOH resin of the present invention include, for example, nylon-6, nylon-6/12, nylon-6/6,6, nylon-11, nylon-12, etc. Copolyamides having a capramide component, especially nylon-6/6,6, are preferred.

Polyesters which may be coextruded with the EVOH of the present invention include, for example, polyethylene terephthalate, polybutylene terephthalate, polyethylene (terephthalate/isophthalate), poly(ethylene/cyclohexanedimethylene) terephthalate, etc. These polyesters may be copolymerized with any diols such as ethylene glycol, butylene glycol, cyclohexanedimethanol, neopentyl glycol, pentanediol, etc.; dicarboxylic acids such as isophthalic acid, benzophenone-dicarboxylic acid, diphenylsulfone-dicarboxylic acid, diphenylmethanedicarboxylic acid, propylene-bis (phenylcarboxylic acid), diphenyloxide-dicarboxylic acid, oxalic acid, malonic acid, succinic acid, glutaric acid, adipic acid, pimelic acid, suberic acid, azelaic acid, sebacic acid, diethylsuccinic acid, etc.

Polystyrenes which may be coextruded with the EVOH resin of the present invention include, for example, not only styrene homopolymers but also styrene copolymers with any other monomers other than styrene, as well as blends of such polystyrenes with other resins prepared by polymerizing monomers other than styrene. Specifically, they include styrene homopolymers, so-called HIPS (high-impact polystyrenes) containing minor amounts of rubber components, ABS (acrylonitrile-butadiene-styrene copolymers), AS (acrylonitrile-styrene copolymers), styrene-diene copolymers and their hydrogenated derivatives, styrene-maleic anhydride copolymers, etc.

The EVOH resin of the present invention has a remarkable effect on the properties of the ultimate extruded product, especially when it is co-extruded with other thermoplastic resins into multi-layered coextrusion products. This effect is especially remarkable when the EVOH is co-extruded with an unsaturated carboxylic acid-grafted polyolefin into multi-layered coextrusion products. The preferred modified polyolefin is an unsaturated carboxylic acid-grafted polyethylene, particularly an unsaturated carboxylic acid-grafted, linear low-density polyethylene having a density of from 0.88 to 0.93 g/cm$^3$ and a melt flow rate (MFR, at 190° C. under 2160° C.) of from 1 to 7 g/10 min.

The EVOH resin of the present invention may be melt processed into various products such as films, sheets, pipes, tubes, bottles, gasoline tanks, etc. The products may also be ground and recycled. The EVOH films or sheets may be monoaxially or biaxially stretched into oriented films or sheets. If desired, they may be thermoformed into trays, cups and other containers. Any processing method for melt-processing the EVOH resin of the present invention may be employed, for example, extrusion processing with a flat die, inflation molding, blow molding, etc. The melt-processing temperature for the EVOH resin of the present invention may fall between 150 and 300° C., preferably between 160 and 280° C., most preferably between 170 and 250° C.

Having generally described this invention, a further understanding can be obtained by reference to certain specific examples which are provided herein for purposes of illustration only, and are not intended to be limiting unless otherwise specified.

EXAMPLES

In the following Examples and Comparative Examples, the samples prepared were analyzed, tested and evaluated according to the methods described below.

(1) Methods for Analyzing Samples:

(1-1) Determination of Alkoxy Group Content, Ethylene Content and Degree of Saponification:

A sample of EVOH is analyzed by extracting it in a Soxhlet extractor with a solvent capable of dissolving the additives in the EVOH, but not substantially dissolving the EVOH itself. For example, chloroform or the like may be used. The additives are thereby fully extracted out and removed from the EVOH sample. The "extracted" EVOH is then dissolved in dimethylsulfoxide (DMSO). The EVOH is then precipitated by pouring the EVOH solution into acetone, thereby providing purified EVOH. Some of the purified EVOH is then dissolved in DMSO-d$_6$. One or two drops of trifluoroacetic acid (TFA) are then added to the EVOH solution in DMSO-d$_6$, and the EVOH is analyzed by nuclear magnetic resonance spectroscopy (NMR) to determine its alkoxy group content, ethylene content and degree of saponification.

The alkoxy group content and the ethylene content of the EVOH resin referred to above is the total amount of alkoxy groups and ethylene, in mol %, respectively, relative to the total number of moles of all monomer units of the EVOH resin. For example, for a sample of an alkoxy group-containing EVOH, the total amount of alkoxy group-containing units or ethylene units compared to the total amount of the ethylene units, vinyl alcohol units, vinyl acetate units and alkoxy group-containing units contained in the sample is expressed in units of mol %. Likewise, the degree of saponification of the EVOH is the mol % of vinyl alcohol units in the polymer relative to the total number amount of vinyl alcohol units and vinyl acetate units.

Apparatus used: JEOL's super-conducting NMR, model Lambda 500.
   Solvent: DMSO-d$_6$ (with TFA added)
   Concentration: 5% by weight polymer.
   Temperature: 80° C.
   Resonance frequency: $^1$H, 500 MHz.
   Flip angle: 45°.
   Pulse delay time: 4.0 sec.
   Accumulation: 6000 times.

(1-2) Determination of the Content of Conjugated Double Bond-Containing Compound and that of Higher Fatty Acid and its Derivative:

As described above, a solvent capable of dissolving the conjugated double bond-containing compound or the fatty acid and its derivatives, but not substantially dissolving the EVOH resin is selected. As described above, the conjugated double bond-containing compound or the fatty acid and its derivatives is extracted from the sample of EVOH to be analyzed into the solvent, and the resulting extract is analyzed by a suitable method to thereby quantitatively determine amount of the conjugated double bond-containing compound or the fatty acid and its derivatives in the sample. For example, suitable methods may include appropriate well known chromatography methods such as gas chromatography (GC), high performance liquid chromatography (HPLC), ion chromatography (IC), etc.

(1-3) Determination of Boron Compound Content:

A sample of EVOH is analyzed placing it in a ceramic crucible, then ashing it in an electric furnace. The resulting ash is dissolved in 200 ml of an aqueous solution of 0.01 N nitric acid, and the solution is analyzed by atomic spectrometry to thereby quantitatively determine the amount of elemental boron in the sample. Since the amount of boron compound originally in the EVOH sample is proportional to the amount of elemental boron determined in this analysis, the amount of boron compound may be expressed in terms of the amount of elemental boron.

(2) Methods for Testing and Evaluating Samples:

(2-1) Surface Smoothness:

A coextrusion film-forming apparatus was equipped with two extruders (one for EVOH, having an opening diameter of 50 mmφ; and the other for another thermoplastic resin, having an opening diameter of 65 mmφ), a selector plug-fitted feed block, and a T-die having a lip-to-lip distance of 620 mm. A single-layered melt of EVOH, or a multi-layered melt of EVOH and another thermoplastic resin was extruded using this apparatus and formed into a film on a 90 mmφ chromium-plated mirror roll using a 20 cm air gap (the air gap is the distance between the die lip and the EVOH-receiving surface of the first roll). In order to change the layer composition of the film, the selector plug of the feed block is changed.

The film formed is sampled and its appearance is macroscopically checked to evaluate its surface smoothness approximately one hour after starting the extrusion process. The observations of five panelists who check the surface smoothness of the film sample are averaged. The film evaluation is made according the following criteria:
   A: No streaks are observed, and the films are commercially acceptable.
   B: Slight streaks are observed, but they are negligible. The films are commercially acceptable.
   C: Streaks are observed, and the films are commercially unacceptable and have little commercial value.
   D: Streaks are readily apparent, and the film has no commercial value.

(2-2) Melt Extrusion Stability:

An extruded monolayer film or a two-layered coextruded film is produced as described above in (2-1). The screw load fluctuation in the extruder is monitored (by recording the amount of current drawn by the extruder motor during the extrusion process) approximately one hour after starting the extrusion process. Based on the screw load fluctuation data, the melt extrusion stability of the EVOH tested is determined according to the following criteria:

A: The screw load fluctuation is relatively small, approximately 2 amperes, and no difficulties were encountered in the film-forming operation.

B: The screw load fluctuation is relatively small, between approximately 4 and 5 amperes or so, and no difficulties were encountered in the film-forming operation.

C: The screw load fluctuation is relatively large, between approximately 7 and 8 amperes or so, and some difficulties were encountered in the film-forming operation.

D: The screw load fluctuation is quite large, 10 amperes or more, and significant difficulties were encountered in the film-forming operation.

(2-3) Drawdown Resistance:

A extruded monolayer film or a two-layered coextruded film was produced as described above in (2-1). The condition of the EVOH melt extruded out through the die lip is checked approximately one hour after starting the extrusion process. Based on this observation, the drawdown resistance of the EVOH tested is determined according to the following criteria:

A: Drawdown is negligible, and causes no difficulties in the film-forming operation.

B: Slight drawdown is observed, but causes little difficulty in the film-forming operation.

C: Drawdown is observed, and causes some difficulty in the film-forming operation.

D: Drawdown is substantial, and causes significant difficulty in the film-forming operation.

(2-4) Interlayer Adhesion:

A two-layered coextruded film is sampled approximately one hour after starting the extrusion process. The film sample is thoroughly conditioned in an atmosphere of 20° C. and 65% RH, and cut into a strip having a length of 150 mm and a width of 15 mm, so that the length of the strip is oriented parallel to the extrusion direction. The strip is tested at a pulling rate of 250 mm/min in the atmosphere of 20° C. and 65% RH using a Shimadzu Seisakusho tensile tester, model Autograph DCS-50M, to determine its peel strength.

(2-5) Gas-Barrier Properties (Oxygen Transmission Rate):

The monolayer extruded films or two-layered coextruded film samples, prepared as described above were thoroughly conditioned in an atmosphere of 20° C. and 85% RH. The samples were tested at 20° C. and 85% RH according to JIS K7126 (isobaric method), using a Modern Controls' oxygen transmission meter, MOCON Model OX-TRAN 2/20.

Example 1

20000 parts by weight of vinyl acetate, 2000 parts by weight of methanol, and 10 parts by weight of 2,2'-azobis(4-methoxy-2,4-dimethylvaleronitrile) polymerization initiator were put into a polymerization tank equipped with a condenser and a stirrer. The polymerization tank was then purged with nitrogen while stirring the contents. The internal temperature of the tank was controlled at 60° C., and ethylene was introduced into the tank at an ethylene pressure of 45 kg/cm². The monomer mixture was polymerized for 4 hours with continued stirring at the controlled temperature and pressure. Next, 10 parts by weight (corresponding to 0.05% by weight of vinyl acetate) of 2,4-diphenyl-4-methyl-1-pentene (DPMP) was dissolved in methanol, thereby forming a 1.5 wt. % solution, and added to the tank. The degree of polymerization of the resulting polymer was 45% based on the amount of vinyl acetate added to the tank. The tank pressure was then reduced to normal atmospheric pressure, and the unreacted ethylene was evaporated off.

Next, a methanol solution was continuously fed into the top of a purging column filled with raschig rings, so that the flow of methanol was in the downward direction, while methanol vapor was jetted into the column through its bottom. The unreacted vinyl acetate monomer was purged away along with the methanol vapor through the top of the column and removed via a condenser connected to the column. A methanol solution of 40 wt. % EVA having an unreacted vinyl acetate content of 0.005% by weight was obtained.

The methanol solution of EVA was then fed into a saponification reactor, to which was added a sodium hydroxide/methanol solution (85 g/liter) in an amount of 0.5 equivalents of sodium hydroxide based on the number of moles of vinyl acetate units in the copolymer. Additional methanol was added so that the copolymer concentration in the solution was controlled to be 15% by weight. This solution was then heated at 60° C. and allowed to react for about 5 hours while nitrogen gas was continuously introduced into the reactor. Next, the reaction mixture was neutralized with acetic acid to stop the reaction. The resulting product was taken out of the reactor and upon standing at room temperature, it precipitated in the form of granules. The polymer granules were dewatered through centrifugation. The polymer granules were washed with a large amount of water, and again dewatered. This operation was repeated at least one more time.

The resulting granules were treated with an aqueous solution containing acetic acid and orthoboric acid (OBA) (0.5 g of acetic acid and 0.35 g of orthoboric acid were dissolved in 1 liter of water). The volume ratio of the granules to the aqueous solution was 20:1. After having been thus treated, the granules were dried, and then mixed with fine powder of ethylene-bis (stearamide) (EBSA: the bisamide of ethylenediamine and stearic acid) in a blender, and then pelletized through an extruder.

A sample of the resulting EVOH pellets was extracted in a Soxhlet extractor with chloroform for 48 hours as described above to extract out the additives and purify the EVOH. The thus-purified EVOH was analyzed by NMR spectrometry. The NMR spectrum had a peak attributable to the hydrogen atoms of a methylene group at around 1 to 1.8 ppm; a peak attributable to the hydrogen atoms of the methyl group of the vinyl acetate monomer unit at around 2 ppm; a peak attributable to the hydrogen atoms of a methoxy group at around 3 to 3.15 ppm; and a peak attributable to the hydrogen atom of the methine group of the vinyl alcohol unit at around 3.15 to 4.15 ppm. The data observed in the NMR spectrum confirmed that the amount of ethylene units of the EVOH copolymer was 32 mol %, the degree of saponification thereof was 99.5 mol %, and the amount of methoxy group-containing monomer units in the EVOH resin was 0.01 mol %.

The compounds extracted by the Soxhlet extraction were quantified through high-performance liquid chromatography, based on calibration curves obtained by analysis of standard solutions of these additives. As a result, the 2,4-diphenyl-4-methyl-1-pentene (DPMP) content of the EVOH was determined to be 230 ppm and the ethylene-bis(stearamide) (EBSA) content was determined to be 300 ppm. The boron compound content of the EVOH was obtained as described above, and was 260 ppm expressed as elemental boron.

The EVOH resin was formed into a single-layered film having a thickness of 20 μm, and the film was tested and evaluated as described above, and the results are provided in Table 1 and Table 2.

Example 2

EVOH pellets were prepared and analyzed in the same manner as in Example 1, except that sorbic acid (SA) was added to the resin instead of DPMP. As in Example 1, the EVOH pellets were formed into a single-layered film, tested and evaluated as described above. The results of these analyses and tests are provided in Table 1 and Table 2.

Example 3

EVOH pellets were prepared and analyzed in the same manner as in Example 2, except magnesium stearate (SAMg) was used instead of EBSA. As in Example 1, the EVOH pellets were formed into a single-layered film, tested and evaluated as described above. The results of these analyses and tests are provided in Table 1 and Table 2.

Example 4

EVOH pellets were prepared and analyzed in the same manner as in Example 2, except that OBA was not used. As in Example 1, the EVOH pellets were formed into a single-layered film, tested and evaluated as described above. The results of these analyses and tests are provided in Table 1 and Table 2.

Example 5

The EVOH prepared in Example 2 was co-extruded along with maleic anhydride-grafted linear low-density polyethylene (MA-LLDPE, having a maleic anhydride content of 0.2% by weight, an MFR of 1.8 g/10 min, and a density of 0.91 g/cm$^3$), into a two-layered film. The extruder temperature and the die temperature were both 220° C. The total film thickness was 50 μm, the thickness of the EVOH layer was 20 μm and that of the MA-LLDPE was 30 μm. The film was tested and evaluated according to the methods described above. The results of these analyses and tests are provided in Table 1 and Table 2.

Example 6

A two-layered film was formed in the same manner as in Example 5, except that the EVOH prepared in Example 3 was used instead of the EVOH of Example 2. The film was tested and evaluated according to the methods described above. The results of these analyses and tests are provided in Table 1 and Table 2.

Example 7

A two-layered film was formed in the same manner as in Example 5, except that the EVOH prepared in Example 4 was used instead of the EVOH of Example 2. The film was tested and evaluated according to the methods described above. The results of these analyses and tests are provided in Table 1 and Table 2.

Example 8

EVOH pellets were prepared and analyzed in the same manner as in Example 1, except that EBSA was not added to the EVOH. As in Example 1, the EVOH pellets were formed into a single-layered film, tested and evaluated as described above. The results of these analyses and tests are provided in Table 1 and Table 2.

Example 9

EVOH pellets were prepared and analyzed in the same manner as in Example 1, except that the polymerization initiator was azobisisobutyronitrile instead of 2,2'-azobis-(4-methoxy-2,4-dimethylvaleronitrile); N-ethoxymethylacrylamide was a further comonomer is addition to ethylene. The N-ethoxymethylacrylamide content of the EVOH was determined to be 0.5 mol %, using the NMR analysis described above. As in Example 1, the EVOH pellets were formed into a single-layered film, tested and evaluated as described above. The results of these analyses and tests are provided in Table 1 and Table 2.

Example 10

A two-resin three-layered film was formed by coextrusion as in Example 5, except copolyamide 6/66 (nylon 6166, Ube Kosan's USE Nylon 5033B, having a melting point of 195° C. and a relative viscosity of 4.40 in 98% sulfuric acid) was used instead of MA-LLDPE. The extruder temperature and the die temperature were both 240° C. The total film thickness was 50 μm, and the three-layered film had the following structure: 15 μm nylon 6/66 layer/20 μm EVOH layer/15 μm nylon 6/66 layer. The film was tested and evaluated according to the methods described above. The results of these analyses and tests are provided in Table 1 and Table 2.

Example 11

Vinyl acetate was added to an 800 liter polymerization tank equipped with a vertical, 12-tube, wetted wall heat exchanger having a heat exchange area of 5 m$^2$, through the heat exchanger, at a rate of 35 kg/hr. A coolant (30 wt. % aqueous methanol solution) at −3° C. was circulated outside the heat exchanger, at a rate of 2.0 m$^3$/hr. In addition, ethylene, 2,2'-azobis-(4-methoxy-2,4-dimethylvaleronitrile) (polymerization initiator) and methanol (polymerization solvent) were added directly into the tank at a rate of 6.5 kg/hr, 17 g/hr and 2.5 kg/hr, respectively. The vinyl acetate added to the polymerization tank via the heat exchanger formed a film in the heat exchanger and contacted the ethylene vapor added to the polymerization tank, thereby absorbing and dissolving the ethylene in the heat exchanger. The vinyl acetate then drained into the polymerization tank, and mixed with the liquid therein. In that manner, the monomers were continuously polymerized at a polymerization temperature of 65° C. and a polymerization pressure of 46 kg/cm$^2$ in the tank to provide a polymerization mixture, containing an EVA resin, at a rate of 43 kg/hr.

The polymerization mixture thus formed was continuously removed from the bottom of the polymerization tank and added to a methanol solution of SA to remove the vaporized unreacted ethylene from the mixture. The resulting methanol solution of EVA was continuously fed into the top of a purging column filled with raschig rings, so that the flow of methanol was in the downward direction, while methanol vapor was jetted into the column through its bottom. The unreacted vinyl acetate monomer was purged away along with the methanol vapor through the top of the column and removed via a condenser connected to the column. A methanol solution of 33 wt. % EVA was obtained. The methanol solution of EVA was fed into a saponification reactor, to which was added sodium hydroxide/methanol solution (80 g/liter) in an amount of 0.55 equivalents based on number of moles of vinyl acetate units in the EVA copolymer. Additional methanol was added so that the EVA concentration in the solution was maintained at 15% by weight. The solution was then heated to 60° C. and reacted for 5 hours, under a continuous nitrogen gas purge in the reactor. Next, the solution was neutralized with acetic acid to stop the reaction. The resulting product was taken out of the reactor and precipitated in a granular form upon cooling to room temperature. The granules were dewatered by centrifugation, washed with a large amount of water and dewatered again. The water washing operation was then repeated at least one more time.

The resulting granules were treated with an aqueous solution containing acetic acid and OBA (0.55 g of acetic acid and 0.4 g of OBA were dissolved in 1 liter of water). The volume ratio of the granules to the aqueous solution was 25:1. After treatment, the granules were dried, and then mixed with a fine powder of ethylene-bis (oleamide) (EBOA—this is bisamide of ethylenediamine and oleic acid) in a blender, and then pelletized with an extruder heated to 215° C.

The additives were extracted from the resulting EVOH pellets with chloroform for 48 hours in a Soxhlet extractor, thereby providing purified EVOH. The thus-purified EVOH was analyzed by NMR spectrometry. The NMR spectrum of the purified EVOH confirmed that the EVOH contained 31 mol % ethylene units, had a degree of saponification of 99.6 mol %, and contained 0.012 mol % of units containing methoxy groups.

The additives extracted by Soxhlet extraction were quantified by high-performance liquid chromatography, using calibration curves derived from analysis of solutions having known concentrations of the compounds quantified. The SA content of the EVOH was determined to be 200 ppm and the EBOA content was determined to be 350 ppm. The OBA content of the EVOH pellets was determined as described above, and was 220 ppm, expressed as elemental boron.

The EVOH pellets were co-extruded into a two-layered film in the same manner as described in Example 5, and was tested and evaluated as described above. The surface smoothness, melt-extrusion stability and drawdown resistance of the film were all good and had a rank of "A", according to the ranking scheme described above. The film did not peel, indicating that the interlayer adhesion was good. The oxygen permeation rate of the film was 1.1 ml/(m²·day·atm.), indicating good gas-barrier properties. The results of the analyses and tests are provided in Table 1 and Table 2.

Comparative Example 1

EVOH pellets were prepared and analyzed as in Example 1, except the polymerization initiator was azobisisobutyronitrile, instead of 2,2'-azobis-(4-methoxy-2,4-dimethylvaleronitrile); and DPMP, EBSA, and OBA were not used. As in Example 1, the EVOH pellets were formed into a single-layered film, and tested and evaluated as described above. The results of these analyses and tests are provided in Table 1 and Table 2.

The NMR analysis of the EVOH resin prepared according to Comparative Example 1 did not show a peak for the hydrogen atom of a methoxy group appearing in the range of 3.00 to 3.15 ppm in the NMR spectrum.

Comparative Example 2

EVOH pellets were prepared and analyzed in the same manner as in Example 1, except that the polymerization initiator was azobisisobutyronitrile, instead of 2,2'-azobis-(4-methoxy-2,4-dimethylvaleronitrile). As in Example 1, the EVOH pellets were formed into a single-layered film, and tested and evaluated as described above. The results of these analyses and tests are provided in Table 1 and Table 2.

The NMR analysis of the EVOH resin prepared according to Comparative Example 2 did not show a peak for the hydrogen atom of a methoxy group appearing in the range of 3.00 to 3.15 ppm in the NMR spectrum.

Comparative Example 3

EVOH pellets were prepared and analyzed in the same manner as in Example 1, except that DPMP was not added to EVOH. As in Example 1, the EVOH pellets were formed into a single-layered film, and tested and evaluated as described above. The results of these analyses and tests are provided in Table 1 and Table 2.

Comparative Example 4

EVOH pellets were prepared and analyzed in the same manner as in Example 1, except that the amount of DPMP added to EVOH was 3200 ppm. As in Example 1, the EVOH pellets were formed into a single-layered film, and tested and evaluated as described above. The results of these analyses and tests are provided in Table 1 and Table 2.

Comparative Example 5

EVOH pellets were prepared and analyzed in the same manner as in Example 9, except that amount of N-ethoxymethylacrylamide of the resulting copolymer was 1.5 mol %. As in Example 1, the EVOH pellets were formed into a single-layered film, and tested and evaluated as described above. The results of these analyses and tests are provided in Table 1 and Table 2.

Comparative Example 6

EVOH pellets were prepared and analyzed in the same manner as in Example 1, except that the ethylene content of the resulting EVOH copolymer was 65 mol %. As in Example 1, the EVOH pellets were formed into a single-layered film, and tested and evaluated as described above. The results of these analyses and tests are provided in Table 1 and Table 2.

Comparative Example 7

Polymer pellets were prepared and analyzed in the same manner as in Example 1, except that ethylene was not used. Thus, after saponification, the resulting polymer was polyvinyl alcohol rather than EVOH. Forming the pellets into a single-layered polyvinyl alcohol film according to the method of Example 1 was attempted, but the surface of the film formed was poor from the start of the film-forming operation. Accordingly, immediately after the film was sampled, the extrusion process was stopped. The polyvinyl alcohol composition was tested and evaluated as described above. The results of these analyses and tests are provided in Table 1 and Table 2.

Comparative Example 8

EVOH pellets were prepared and analyzed in the same manner as in Example 1, except that the saponification conditions were varied so that the degree of saponification of the resulting EVOH was 80 mol %. As in Example 1, the EVOH pellets were formed into a single-layered film, and tested and evaluated as described above. The results of these analyses and tests are provided in Table 1 and Table 2.

Comparative Example 9

EVOH pellets were prepared and analyzed in the same manner as in Example 1, except that an α-methylstyrene polymer having a molecular weight of 1100 (MS polymer—this has a conjugated double bond at the terminal of the molecule) was used instead of DPMP. As in Example 1, the EVOH pellets were formed into a single-layered film, and tested and evaluated as described above. The results of these analyses and tests are provided in Table 1 and Table 2.

Comparative Example 10

A two-layered film was formed in the same manner as in Example 5, except the EVOH prepared in Comparative Example I was used. The two-layered film was tested and analyzed as described above. The results of these analyses and tests are provided in Table 1 and Table 2.

Comparative Example 11

A two-resin three-layered film was formed in the same manner as in Example 10, except the EVOH prepared in Comparative Example 2 was used. The two-layered film was tested and analyzed as described above. The results of these analyses and tests are provided in Table 1 and Table 2.

TABLE 1

| | Alkoxy Group (-OR) | | Ethylene | Degree of | Conjugated Double Bond-Having Compound | | Higher Fatty Acid Derivative | | | |
|---|---|---|---|---|---|---|---|---|---|---|
| | R | Content (mol %) | Content (mol %) | Saponification (mol %) | Compound | (ppm) | Derivative | (ppm) | OBA (ppm)*1 | MFR (g/10 min) |
| Example 1 | methyl | 0.01 | 32 | 99.5 | DPMP | 230 | EBSA | 300 | 260 | 1.6 |
| Example 2 | " | " | " | " | SA | 150 | " | " | " | " |
| Example 3 | " | " | " | " | " | " | SAMg | " | " | " |
| Example 4 | " | " | " | " | " | " | EBSA | " | — | 12.5 |
| Example 5 | " | " | " | " | " | " | " | " | 260 | 1.6 |
| Example 6 | " | " | " | " | " | " | SAMg | " | " | " |
| Example 7 | " | " | " | " | " | " | EBSA | " | — | 12.5 |
| Example 8 | " | " | " | " | DPMP | 230 | — | — | 260 | 1.6 |
| Example 9 | ethyl | 0.5 | " | " | " | " | EBSA | 300 | " | " |
| Example 10 | methyl | 0.01 | " | " | SA | 150 | " | " | " | " |
| Example 11 | " | 0.012 | 31 | 99.6 | " | 200 | EBOA | 350 | 220 | 1.5 |
| Co. Ex. 1 | — | — | 32 | 99.5 | — | — | — | — | — | 12.5 |
| Co. Ex. 2 | — | — | " | " | DPMP | 230 | EBSA | 300 | 260 | 1.6 |
| Co. Ex. 3 | methyl | 0.01 | " | " | — | — | " | " | " | " |
| Co. Ex. 4 | " | " | " | " | DPMP | 3200 | " | " | " | " |
| Co. Ex. 5 | ethyl | 1.5 | " | " | " | 230 | " | " | " | " |
| Co. Ex. 6 | methyl | 0.01 | 65 | " | " | " | " | " | " | " |
| Co. Ex. 7 | " | " | — | " | " | " | " | " | " | " |
| Co. Ex. 8 | " | " | 32 | 80 | " | " | " | " | " | " |
| Co. Ex. 9 | " | " | " | 99.5 | MS Polymer | " | " | " | " | " |
| Co. Ex. 10 | — | — | " | " | — | — | — | — | — | 12.5 |
| Co. Ex. 11 | — | — | " | " | DPMP | 230 | EBSA | 300 | 260 | 1.6 |

*1 Orthoboric acid content (in terms of elemental boron).

TABLE 2

Test Data

| | Surface Smoothness | Melt Extrusion Stability | Drawdown Resistance | Layered Thermoplastic Resin | Interlayer Adhesiveness (g/15 mm) | Gas-Barrier Properties (oxygen transmission rate)*1 |
|---|---|---|---|---|---|---|
| Example 1 | B | A | A | — | — | 1.2 |
| Example 2 | A | A | A | — | — | 1.0 |
| Example 3 | A | B | A | — | — | " |
| Example 4 | A | B | B | — | — | " |
| Example 5 | A | A | A | MA-LLDPE | 700 | " |
| Example 6 | A | B | A | " | 600 | " |
| Example 7 | A | B | A | " | 450 | " |
| Example 8 | B | B | B | — | — | 1.3 |
| Example 9 | B | A | A | — | — | 1.8 |
| Example 10 | A | A | A | Nylon-6/66 | not peeled | 0.9 |
| Example 11 | A | A | A | MA-LLDPE | not peeled | 1.1 |
| Co. Example 1 | C | D | D | — | — | 2.0 |

TABLE 2-continued

Test Data

|  | Surface Smoothness | Melt Extrusion Stability | Drawdown Resistance | Layered Thermoplastic Resin | Interlayer Adhesiveness (g/15 mm) | Gas-Barrier Properties (oxygen transmission rate)*1 |
|---|---|---|---|---|---|---|
| Co. Example 2 | C | C | B | — | — | " |
| Co. Example 3 | C | C | B | — | — | 1.9 |
| Co. Example 4 | D | C | C | — | — | 3.5 |
| Co. Example 5 | B | C | D | — | — | 5.5 |
| Co. Example 6 | C | C | C | — | — | 18 |
| Co. Example 7 | D | D | — | — | — | 20 |
| Co. Example 8 | D | D | D | — | — | 85 |
| Co. Example 9 | D | D | C | — | — | 2.5 |
| Co. Example 10 | D | D | C | MA-LLDPE | 500 | 2.0 |
| Co. Example 11 | C | C | B | Nylon-6/66 | 950 | 1.9 |

*1Units of ml/(m$^2$ · day · atm).

As described above, products produced from the alkoxy group-containing EVOH resin of the present invention have the following advantages:
<1> good surface smoothness;
<2> good melt extrusion stability;
<3> good drawdown resistance;
<4> good interlayer adhesiveness; and
<5> good gas-barrier properties.

The priority document of the present application, Japanese patent application 327793/1999 filed Nov. 18, 1999, is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by letters patent is:

1. A resin composition, which comprises:
a saponified ethylene-vinyl acetate resin,
from 0.1 to 3000 ppm, based on the total amount of the saponified ethylene-vinyl acetate resin, of a compound having a molecular weight of at most 1000 and having at least one conjugated double bond,
from 10 to 5000 ppm of at least one second compound selected from the group consisting of higher fatty acid amides and fatty acid salts, expressed as the ppm of free fatty acid relative to the total amount of the saponified ethylene-vinyl acetate resin, and
from 10 to 5000 ppm, of a boron compound, expressed as the ppm of elemental boron in said boron compound relative to the total amount of the saponified ethylene-vinyl acetate resin,
wherein the saponified ethylene vinyl acetate resin has
a methoxy group content ranging from 0.0005 to 1 mol % based on the total moles of monomer units in the resin,
an ethylene content ranging from 5 to 60 mol % based on the total moles of monomer units in the resin, and
a degree of saponification of at least 85 mol % based on the number of moles of vinyl acetate monomer units in the resin.

2. The resin composition of claim 1, wherein the amount of the compound having a molecular weight of at most 1000 is from 5 to 1500 ppm.

3. The resin composition of claim 1, wherein the compound having a molecular weight of at most 1000 is selected from the group consisting of 1-phenylbutadiene, sorbic acid, 2,4-diphenyl-4-methyl-1-pentene, 1,3-diphenyl-1-butene, 2,3-dimethyl-1,3-butadiene, 4-methyl-1,3-butadiene, 1-phenyl-1,3-butadiene, myrcene and mixtures thereof.

4. The resin composition of claim 1, wherein the saponified ethylene-vinyl acetate resin has a methoxy group content ranging from 0.001 to 0.5 mol %.

5. The resin composition of claim 1, wherein the saponified ethylene-vinyl acetate resin comprises from 20 to 55 mol % of polymerized ethylene units.

6. The resin composition of claim 1, wherein the degree of saponification is at least 98 mol %.

7. The resin composition of claim 1, wherein the amount of the second compound is 100 to 1000 ppm.

8. The resin composition of claim 1, wherein the second compound is derived from a higher fatty acid having 8 to 30 carbon atoms.

9. The resin composition of claim 1, wherein the second compound is selected from the group consisting of palmitamides, stearamides, oleamides, linolic amides, linolenic amides, ethylene-bis-stearamide, ethylene-bis-oleamide, sodium stearate, calcium stearate, magnesium linolenate, and mixtures thereof.

10. The resin composition of claim 1, wherein the amount of the boron compound is 100 to 1500 ppm.

11. The resin composition of claim 1, wherein the boron compound is selected from the group consisting of boric acid, orthoboric acid, metaboric acid, tetraboric acid, alkali metal salts of boric acid, alkaline earth metal salts of boric acid, triethyl borate, trimethyl borate, trialkyl borate, borax, boron hydride, and mixtures thereof.

12. The resin composition of claim 1, wherein the conjugated double bond containing compound has a functional group selected from the group consisting of a carboxyl group, salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group, slats thereof, a phosphoric acid group, salts thereof, a phenyl group, a halogen atom, a double bond and a triple bond.

13. A product comprising the saponified ethylene-vinyl acetate resin of claim 1.

14. The product of claim 13, wherein the product has a form selected from the group consisting of a monolayer film, a multilayer film, a bag, a pouch, a tube, a thermoformed container, an injection molded bottle, a blow molded bottle, a laminated film, and a parison.

15. A method for producing the resin composition of claim 1 comprising:

polymerizing a monomer mixture comprising ethylene and vinyl acetate in the presence of a polymerization initiator having an methoxy group, thereby forming an ethylene-vinyl acetate copolymer;

adding a compound having a molecular weight of at most 1000 and at least one conjugated double bond to the ethylene-vinyl acetate copolymer; then saponifying the ethylene-vinyl acetate copolymer containing a compound having a molecular weight of at most 1000 and at least one conjugated double bond, thereby forming a saponified ethylene-vinyl acetate copolymer, and adding a higher fatty acid amide or fatty acid salt and a boron compound to said saponified ethylene-vinyl acetate copolymer.

16. The method of claim 15, wherein the polymerization initiator having a methoxy group has a structure according to formula (2):

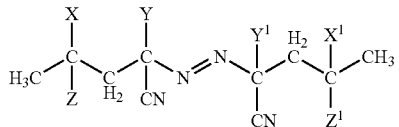

(2)

wherein $X, X^1, Y, Y^1$ each independently represent an alkyl group having 1 to 5 carbon atoms, and $Z$ and $Z^1$ each independently represent an alkoxy group having 1 to 5 carbon atoms and at least one of $Z$ and $Z^1$ is methoxy.

17. The method of claim 16, wherein the polymerization initiator having a methoxy group is 2,2'-azobis(4-methoxy-2,4-dimethylvaleronitrile).

18. A method of extruding a product comprising resin composition of claim 1 comprising:

extruding the saponified ethylene-vinyl acetate resin in a single-layer extrusion apparatus or multi-layer coextrusion apparatus.

* * * * *